United States Patent
Kurz

[19]

[11] Patent Number: 5,869,954
[45] Date of Patent: Feb. 9, 1999

[54] APPARATUS FOR THE CONTROLLED SUPPLY OF CURRENT TO AN ELECTRICAL DEVICE

[76] Inventor: Gerhard Kurz, Industriestrasse, D-75382 Althengstett, Germany

[21] Appl. No.: 73,119

[22] Filed: May 5, 1998

[30]  Foreign Application Priority Data

May 5, 1997 [DE] Germany .................. 197 18 816.8
May 5, 1997 [DE] Germany .................. 297 07 901 U

[51] Int. Cl.$^6$ .......................... G05F 1/455; H01H 3/42
[52] U.S. Cl. .................. 323/237; 200/16 R; 200/551
[58] Field of Search ........................ 323/237, 238, 323/239, 320, 321; 363/144; 200/292, 283, 532, 533, 535, 538, 542, 551, 547, 573, 16 R

[56]  References Cited

U.S. PATENT DOCUMENTS

| 5,030,890 | 7/1991 | Johnson | 323/238 X |
| 5,324,903 | 6/1994 | Moulton | 200/551 X |
| 5,373,224 | 12/1994 | Rabier et al. | 323/237 X |
| 5,410,240 | 4/1995 | Runggaldier et al. | 323/237 |

FOREIGN PATENT DOCUMENTS

| 71 30 971 | 11/1971 | Germany . |
| 24 15 630 | 10/1975 | Germany . |
| 33 03 126 | 8/1984 | Germany . |
| 41 21 264 | 1/1992 | Germany . |
| 43 27 070 | 4/1995 | Germany . |

Primary Examiner—Peter S. Wong
Assistant Examiner—Y. J. Han
Attorney, Agent, or Firm—Cohen, Pontani, Lieberman & Pavane

[57]  ABSTRACT

An apparatus for a controlled supply of current to an electric consumer, including a turn-on function. The apparatus including a circuit board having conductor paths, a subordinated phase control circuit mounted on the circuit board and having a triac switching in both directions of an AC supply voltage and a trigger circuit for triggering the triac, the triac being connected in series with the consumer, a contact point mounted to the board, and a springing metal tongue having a first end mounted to the board and a second end that extends above the contact point at a distance from the board. The metal tongue and the contact point form electric contacts with the conductor paths on the board so as to define a switch. The electric contacts lead to connection points in the trigger circuit of the triac. The triac is operative to control current flow through a load of the consumer so that contact established by a movement of the metal tongue supplies the load with high currents in dependence on a setting via the triac, which is now switched through, while simultaneously there is very low current flow via the switch formed by the metal tongue and the contact point that lies in the triac trigger circuit.

7 Claims, 2 Drawing Sheets

APPARATUS FOR THE CONTROLLED SUPPLY OF CURRENT TO AN ELECTRICAL DEVICE

BACKGROUND OF THE INVENTION

1. Field of the Invention

The present invention relates to an apparatus for a controlled supply of current to electric devices, including a separate turn-on function.

2. Discussion of the Prior Art

In electric devices, especially electric hand tools such as drills, saws, screwdrivers and the like, which are available in great variety as devices for home use, in particular, it is customary to adjust the power absorbed by the device and later put out by the device at its output shaft to the specific given requirements. This is especially important in the case of screwdrivers, so that suitable care can be taken when driving screws and also when removing them.

A so-called phase control circuit is normally used for the purpose of power control. In such a circuit, a triac is connected in series to the load, i.e., usually, in electric hand tools, to the electric motor. The triac switches the network supply voltage or another chopped DC voltage, including a voltage provided with the help of storage batteries, through to the consumer at an adjustable ignition timepoint in the course of a half-wave. This permits an effective control of the power input.

At the same time, this also creates the need to realize a turn-on function for each particular electrical device, so that it is not necessary, for example, to remove the plug from the power outlet each time operation of the device is to be interrupted.

Devices for the power control of electric consumers connected to an AC voltage, normally the network voltage, are known in many different forms, and usually include a phase control circuit by means of which the ignition angle in the electric alternating quantity supplied to the consumer can be adjusted as desired. The supplied power can be controlled in this way.

Such phase control devices are known, for example, from German reference DE 33 03 126 C2. That reference relates to a device for limiting the starting current in a motor control device, equipped with a phase control circuit, for the driving motor of a vacuum cleaner.

Such phase control devices are also known from German reference DE 43 27 070 C1, for example, which describes a device for controlling the input power of a vacuum cleaner. In this case, the alternating current supplied to the electric motor that drives the vacuum cleaner is controlled via a phase control circuit to a value corresponding to the effective value of the motor voltage. The phase control circuits used in these cases usually contain a triac, which is connected to the network in series with the electric consumer, i.e., here, the electric motor, and supplies the electric motor with a gapping (sine) voltage in keeping with the desired power.

Starting from a phase control circuit composed of discrete components—whereby implementations as highly integrated as desired, to the point of pure microprocessor control, are conceivable and possible—the phase control device in the driver circuit for the triac comprises an adjustable resistance, usually in the form of a potentiometer or trimmer, as well as a charging capacitor for igniting the triac in accordance with the set resistance, so that, by suitably shifting the ignition angle, it is possible to call up practically any desired intermediate output, up to a full angle.

Especially in electric hand tools, it is desirable to embody the electric control device for the entire functional sequence, i.e., the turn-on function as well as the controlled power supply via the phase control circuit, inside the device in as space-saving and compact a manner as possible. It is also desirable for this functional sequence to be accessible from the outside by means of suitable operating handles, switches, levers or buttons, so that if the electric tool in question is hand-operated, it can be controlled using the same hand that is used to grasp a device part often embodied in the manner of a pistol grip, e.g., by moving the index or middle finger to activate, for example, a push switch or push lever.

Such push switches are therefore usually embodied so that, immediately after being activated, they activate a separate network switch on a first partial path inside the device, so that the electric area of the device is supplied with voltage. Then, on the further activation path, a so-called "gas-giving" function can be realized, which serves to suitably shift a potentiometer or the like in the control circuit for the triac, so that the triac, due to the shifting of its ignition timepoint, is controlled into conduction to a greater or lesser extent.

A network switch of this type, which implements the turn-on function in conjunction with an external push switch, trigger switch or other shifting lever, must be able, if necessary, to separate the entire device from the network, even at full speed. For this reason, the network switch must be designed with sufficient strength to connect and run high currents. The network switch is therefore expensive, and is arranged as a separate component with its own housing at the desired location in the device or in the region of the board on which the phase control device is mounted.

SUMMARY OF THE INVENTION

The object of the present invention is to decisively simplify the turn-on function for electric devices that are supplied with electric current in a manner controlled by a phase control circuit and, in particular, to decisively reduce the cost of the power supply switch that is always present.

Pursuant to this object, and others which will become apparent hereafter, one aspect of the present invention resides in a device for controlled current supply in which an electric switching element that switches in both directions of the AC supply voltage is arranged in series with the electric consumer. The device includes a springing metal tongue attached to the board that carries the circuit so as to provide a turn-on function. A distal end of the metal tongue which is furthest from the board is arranged in the contact path area of a contact point which is also attached to the board. The two mechanical bearing connections of the metal tongue and the contact point to the board simultaneously constitute electric contacts with standard conductor paths on the back side of the board. These contacts lead to connection points in the trigger circuit of the triac of the phase control circuit. The triac controls the current flow through the load so that contact established by a movement of the metal tongue supplies the load with high currents in dependence on the setting via the triac, which is now switched through. Simultaneously there was a very low current flow via the switch made up of the metal tongue and the contact point that lies in the triac trigger circuit.

The device has the advantage that the switch provided for the complete turn-on function of the device is removed from the network area and shifted into the drive area for the triac of the always present phase control circuit. In this area, the switch is loaded with drastically reduced currents, and therefore becomes considerably less expensive with respect to structure, materials, mounting and basic functions. The switch can thus be economically produced and, advantageously, mounted directly on the board that carries the other electric circuit elements, e.g., for the phase control circuit.

It is also advantageous that the switch components (movable switch lever and counter-contact) can be mounted directly on the board, which thus forms a sort of carrier housing for the switch. These switch components, which are connected directly to the board in mechanical fashion, use the opportunities offered by the board for their electric contacts, namely, the connection of these switch components directly to the conductor paths on the board.

It is thus possible to produce the switch, in a preferred embodiment of the invention, as a simple, suitably bent metal tongue in the form of a simple sheet metal stamped part. The switch can then be easily activated in that an external activation element, which is accessible on the device housing from the outside, is run via the region of the board where the switch is located, so that the activation element, when moved, can cause the metal tongue to carry out a movement relative to the board that can be used for the purpose of making contact. The metal tongue, which is the major component of the switch, is mounted in this case on one side on the board, and can be bent back by the activation element when the latter is moved to a contact point on the board, which contact point constitutes the only other component of the switch.

The board, because it bears the switch component, thus constitutes the switch housing. Preferably, the board also serves as the bearing for the activation element. In any case, the activation element is embodied, in whatever desired form, in such a way that the pressure exerted by the human operator on the outer end area of the activation element is converted into a movement of the metal tongue toward the contact point for the purpose of making contact and thus connecting the gate current to the triac and starting the device.

The activation element can be mounted on the board by means of bearings/slide blocks, which are arranged on the board on both sides of the activation element, and along which the activation element slides, for example, in rail guides or groove guides. The metal tongue can have an upwardly curved end area that, when overrun by the activation element by means of a cam, is pressed downward, in any case, toward the board and the contact point, so that contact is made between the metal tongue and the contact point. A low gate current then flows. In a practical example, this low gate current could lie between 50 and 100 mA, compared to the current of 5 A or more (much more, m some cases, when chopped direct current must be switched in a battery-fed low voltage device) than otherwise flows in switches that implement a turn-on function for electric devices.

A further advantage of the invention is that the switch for the gate current and the adjusting potentiometer for setting the ignition angle of the phase control circuit are both arranged on the same board. As a result, it is possible, by means of suitable kinematic elements or an arrangement in the same sense of the activation parts for the switch and potentiometer of the phase control, to ensure that the activation element first activates the switch and connects the triac and then, in extension of its movement direction, suitably adjusts the potentiometer, so that the motor power can be adjusted as desired, i.e., increased or reduced, by a suitable shift in the trigger timepoint for the triac. When the motor power falls below a lower threshold value, disconnection again occurs, i.e., when the switch tongue is released by the activation element and springs back into its contact-free starting position, the switch for the gate current of the triac opens.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 2:
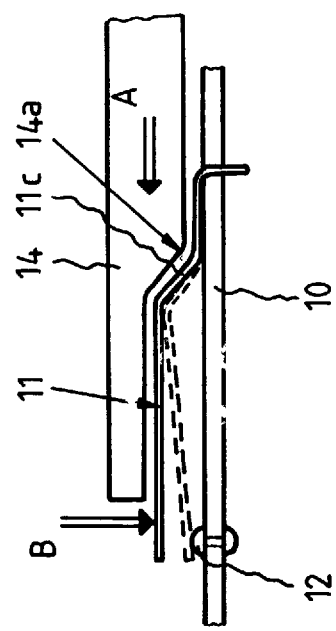
FIG. 2 is an enlarged segment side view, of one embodiment of the mounting of the metal tongue on the board, in conjunction with the possible activation, i.e., contacting, of the metal tongue by moving an activation element.
Figure 1:
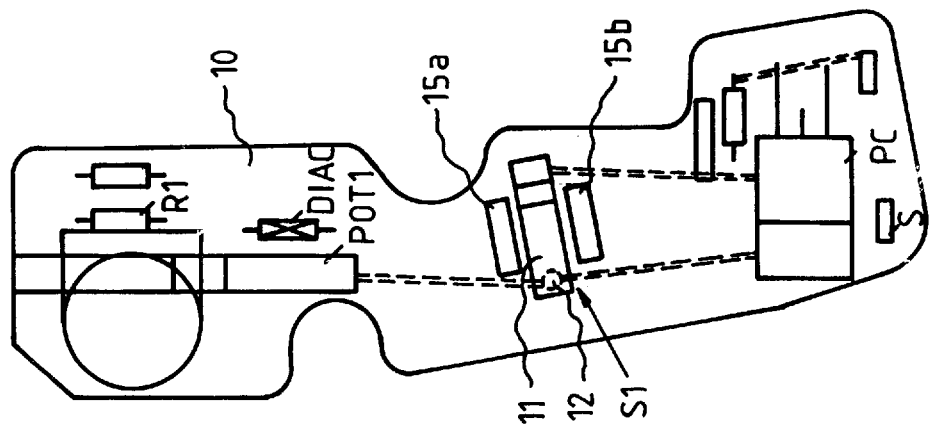
FIG. 1 is a simplified top of a board with circuit elements mounted thereon, including a metal tongue for realizing the turn-on function, together with other components.

FIG. 1 shows a circuit board 10, which can be designed as desired with respect to shape and dimensions, and which bears electric circuit components that need not be discussed in detail, since they can be parts of known phase control circuits for electrical devices and the like. Directly mounted on the board 10 is an electrically conductive, springing metal piece, which is referred to in what follows as the metal tongue 11 and is part of a switch S1, whose structure is completed by an electrically conductive and therefore preferably metal contact point 12. The metal tongue 11 and the contact point 12 are mounted directly on the board 10, as the side view in FIG. 2 shows, so that the board constitutes the housing component of the switch S1. The metal tongue 11, which can be made of a suitable elastically springing copper or brass alloy, for example, has a longitudinal extension and is mounted with one end area on the board 10. The other end, in the manner of a free projection, maintains a distance from the board and thus from the contact point 12, so that the switch S1 is open, as indicated in FIG. 2 in solid lines.

Specifically, the metal tongue 11 can be embodied so that, starting at and extending over the contact point 12, there is initially a longer partial piece that remains at a distance from the contact point and the board. The partial piece then bends downward at a slant toward the board, extends again along the board for a shorter partial distance, and then penetrates the board with one or two downwardly bent legs 11a, 11b. After penetration, the end areas of the legs 11a, 11b become visible on the conductor plate side of the board, where they are connected to one or more conductor paths (FIG. 1 shows the configuration side in a top view). Connection is carried out, in particular, by a suitable soldering process, e.g., immersion soldering, which also securely fixes the entire metal tongue.

Similarly, the contact point 12 is embodied, for example, as a small rivet with an upwardly extending rounded head, which is connected, e.g., by immersion soldering, to further conductor paths on the conductor path side. A simple switch of this type cannot and need not carry high currents, because, as mentioned above, it is arranged only in the control circuit of the triac and thus switches the gate current of the triac. Of course, this results in through-control of the triac TC (see FIG. 4) and thus in the load, which is shown as the resistance RL (alternative) or as the motor M in FIG. 4, being switched onto the network connection clamps N1, N2.

In this context, it should be noted that the switch S1 in the control circuit for the triac TC preferably lies in series with an RC member for time delaying the trigger pulses for the triac TC, i.e., in series with the potentiometer PL and the capacitor C, from whose connection point the trigger pulse is fed via a diac D1 and a further series resistance R1 to the gate of the triac TC. It is also possible, however, to place the switch as S1' directly into the trigger line to the gate, which trigger line branches off from the connection point of the capacitor C to the potentiometer P1.

Figure 4:
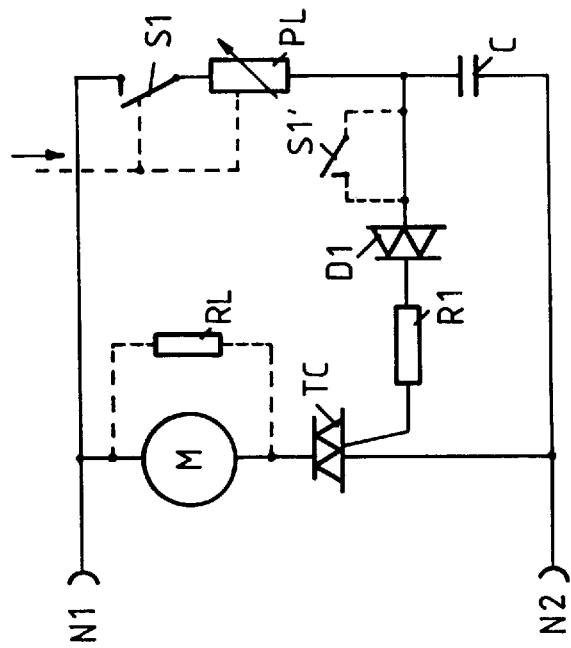
FIG. 4 is a schematic of one embodiment of a phase control circuit of known basic structure, but with the switch arranged in the control circuit for the triac.
Figure 3:
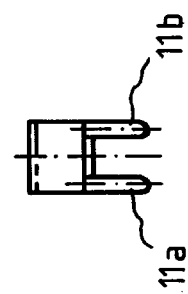
FIG. 3 is an end view of the metal tongue as the main component of the switch, with lower continuations for attachment to the board and simultaneous contact with board conductor paths.

In a preferred embodiment of the invention, the activation element for moving the switch S1, identified in FIG. 2 by reference number 14, is advantageously also mounted on the board 10 and, in any case, is held in a slidable fashion, so that suitable orientation can be attained to the metal tongue 11 and thus to the activation of the switch S1, S1'. The activation element 14 can have a cam slide 14a adjusted to the shape of the switch, which cam slide 14a, during a linear transverse movement of the activation element in the direction of Arrow A (FIG. 2), i.e., along the surface of the board 10, strikes a middle slant portion 11c of the metal tongue 11 and presses the front part of the tongue 11 downward in the direction of the arrow B (FIG. 2). As a result, as the broken line shows, contact is made between the metal tongue 11 and the contact point 12, simultaneously creating a contact connection between the conductor paths of the board soldered to these two connection points, so that the switch S1, S1' in the diagram in FIG. 4 is closed.

To guide the activation element 14 along the board 10, guide blocks 15a, 15b can be provided on both sides of the switch tongue 11. The guide blocks 15a, 15b, which are indicated only schematically in the drawings, hold the activation element 14, for example, by means of groove sliding guides. The switching movement of the activation element 14 is then brought about from outside of the device by means of a suitable push switch, push button or trigger lever, so that a rearward part of the operating element 14a, which is acted on by a finger of the human operator, extends to the outside through a device housing opening. At the same time, it is possible to install potentiometers or the like on the board in such a way that the activation element 14 also adjusts the potentiometer. Such designs need not be discussed further here, because, as known to those skilled in the art, many embodiments are possible, depending on the intended application, shape of the board, and type of potentiometer used (linear potentiometer or rotary potentiometer).

Advantageously, a return spring acts upon the activation element 14, guiding the activation element 14 back into a starting position after its release by the finger of the operator, i.e., after removal of the activation pressure, so that the metal tongue 11 can also return to its original starting position above the contact point 12, whereupon the switch S1 is again opened and the device is turned off by blocking the triac TC. Then, no further current flows through the load.

The invention is not limited by the embodiments described above which are presented as examples only but can be modified in various ways within the scope of protection defined by the appended patent claims.

I claim:

1. An apparatus for a controlled supply of current to an electric consumer, including a turn-on function, comprising:

a circuit board having conductor paths;

a subordinated phase control circuit mounted on the circuit board and having a triac switchable in both directions of an AC supply voltage, and trigger circuit means for triggering the triac, the triac being connected in series with the consumer;

a contact point mounted to the board; and a springing metal tongue having a first end mounted to the board and a second end that extends above the contact point at a distance from the board, the metal tongue and the contact point forming electric contacts with the conductor paths on the board so as to define a switch, the electric contacts leading to connection points in the trigger circuit means of the triac, the triac being operative to control current flow through a load of the consumer so that contact established by a movement of the metal tongue supplies the load with high currents in dependence on a setting via the triac, which is now switched through, while simultaneously there is very low current flow via the switch formed by the metal tongue and the contact point that lies in the triac trigger circuit.

2. A device as defined in claim 1, and further comprising an activation element mounted on the board so as to be slidable along a movement path, the metal tongue being arranged in the movement path of the activation element so that a sliding movement of the activation element causes the second end of the metal tongue to make contact with the contact point.

3. A device as defined in claim 2, wherein the metal tongue, starting from the first, mounted end, defines a path that is bent upward in springing fashion at a distance from the board, the activation element having a cam-type running shape corresponding to the bend so that, during a relative shift of the activation element and the metal tongue upon sliding of the activation element, the bent part of the metal tongue is overrun by the activation element, whereupon the second end of the metal tongue contacts the contact point.

4. A device as defined in claim 2, and further comprising an RC member operatively connected to a potentiometer that determines a trigger timepoint of the triac via the RC member, the potentiometer being mounted on the board in the control circuit so as to undergo simultaneous adjustment via the activation element after the activation element has first caused the tongue to contact the contact point.

5. A device as defined in claim 4, wherein the switch formed by the metal tongue and the contact point is arranged on the board in series with the RC member in the control circuit of the triac.

6. A device as defined in claim 4, wherein the switch formed by the metal tongue and the contact point is arranged on the board in a conductive path leading from a connection point of the RC member to a gate of the triac.

7. A device as defined in claim 2, and further comprising guide blocks mounted on the board so as to guide movement of the activation element.

* * * * *